K. BAUMANN.
FEED WATER HEATER.
APPLICATION FILED OCT. 21, 1916.

1,342,841.

Patented June 8, 1920.
8 SHEETS—SHEET 1.

INVENTOR
Karl Baumann
ATTORNEY

K. BAUMANN.
FEED WATER HEATER.
APPLICATION FILED OCT. 21, 1916.

1,342,841.

Patented June 8, 1920.
8 SHEETS—SHEET 2.

INVENTOR
Karl Baumann
ATTORNEY

K. BAUMANN.
FEED WATER HEATER.
APPLICATION FILED OCT. 21, 1916.

1,342,841.

Patented June 8, 1920.

INVENTOR.
Karl Baumann
by Jno. S. Green.
ATTORNEY

K. BAUMANN.
FEED WATER HEATER.
APPLICATION FILED OCT. 21, 1916.

1,342,841. Patented June 8, 1920.
8 SHEETS—SHEET 5.

INVENTOR:
Karl Baumann.
ATTORNEY

K. BAUMANN.
FEED WATER HEATER.
APPLICATION FILED OCT. 21, 1916.

1,342,841.

Patented June 8, 1920.

INVENTOR.
Karl Baumann
ATTORNEYS.

UNITED STATES PATENT OFFICE.

KARL BAUMANN, OF URMSTON, ENGLAND, ASSIGNOR TO THE BRITISH WESTING-HOUSE ELECTRIC AND MANUFACTURING COMPANY LIMITED, A COMPANY OF GREAT BRITAIN.

FEED-WATER HEATER.

1,342,841.  Specification of Letters Patent.  Patented June 8, 1920.

Application filed October 21, 1916. Serial No. 127,007.

*To all whom it may concern:*

Be it known that I, KARL BAUMANN, a citizen of the Confederation of Switzerland, and a resident of Urmston, in the county of Lancaster, England, have invented a new and useful Improvement in or Relating to Feed-Water Heaters, of which the following is a specification.

This invention relates to feed water heaters and in particular to feed water heaters for power producing plants in which the main prime mover is a condensing steam turbine and the steam for heating the feed water is taken from an operative low pressure stage of the main turbine of the plant from which it passes into a steam chest or belt communicating with the turbine cylinder and partially or wholly surrounding the latter.

According to the present invention the heater for heating the feed water is located in said steam chest or belt or in an extension or enlargement thereof. In this way a considerable saving in space is effected as well as a reduction in the cost of construction, and a compact design of turbine and heater is obtained. With this construction also the heat losses occurring are considerably less than with the arrangements heretofore adopted, in which the feed water heater forms a separate portion of the plant.

In a modification of the invention the heater for the feed water is located in a separate compartment formed within the condenser shell or an extension of the same and directly connected with the aforesaid steam chest or belt.

Several ways in which the invention may be carried into effect are illustrated by way of example in the accompanying drawings in which

Fig. 7 is a vertical longitudinal section, and Fig. 8 as to its center portion a cross-sectional view taken on the line VII—VII and as to its outer portions a cross-sectional view taken on the line VIII—VIII of Fig. 7 of a turbine having its exhaust casing and supporting feet constructed as described in my application, Serial No. 123,697, filed Oct. 4, 1916, with a feed water heater associated therewith in accordance with the present invention.

Fig. 13 is a view similar to Fig. 8 but showing a feed water heater of a different kind, and Fig. 14 an end view of the heater in Fig. 13.

Fig. 15 is a transverse cross section and Fig. 16 a fragmentary vertical longitudinal section of a turbine showing another constructional form of the invention.

Fig. 19 is a diagrammatic sectional view showing the heater located in a separate compartment formed in the condenser shell.

The same reference letters are used throughout the drawings to indicate like parts, and the arrows on the section indicating lines show the direction in which the sectional views are taken.

Referring to Figs. 1 to 6, the turbine cylinder is indicated at 1 and the exhaust casing at 2. A steam chest or belt 3 surrounds the turbine cylinder and communicates with the latter through a series of slots 4, 4 through which a portion of the steam flowing through an operative low pressure stage of the turbine passes into said belt 3. The lower half of the steam chest or belt 3 is extended to form a compartment 5 for the reception of a feed water heater 6 of the surface type. The heater tubes are indicated at 7 and are provided at either end with water boxes 8, 9 to form a four-flow heater of well known construction. The water boxes 8 and 9 shown in Figs. 4 and 6 respectively, are attached to facings 10, 11, formed in the lower portion of the extension 5 of the steam chest or belt 3. Drains 12 are provided in the bottom of the heater compartment 5 through which the condensed heating steam and vapors are led away.

Figure 1:
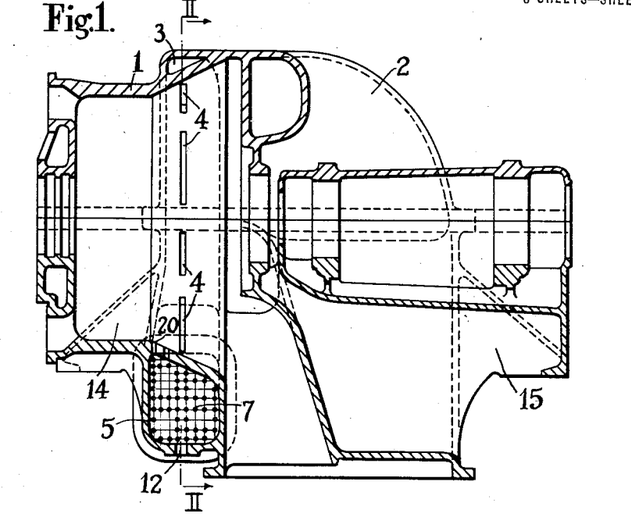
Figure 1 is a vertical longitudinal section of a turbine cylinder and exhaust casing with a feed water heater combined therewith in accordance with the present invention, Fig. 2 a cross section on the line II—II of Fig. 1, and Fig. 3 a plan view of the bottom half of the turbine cylinder and exhaust casing shown in Figs. 1 and 2.
Figure 2:
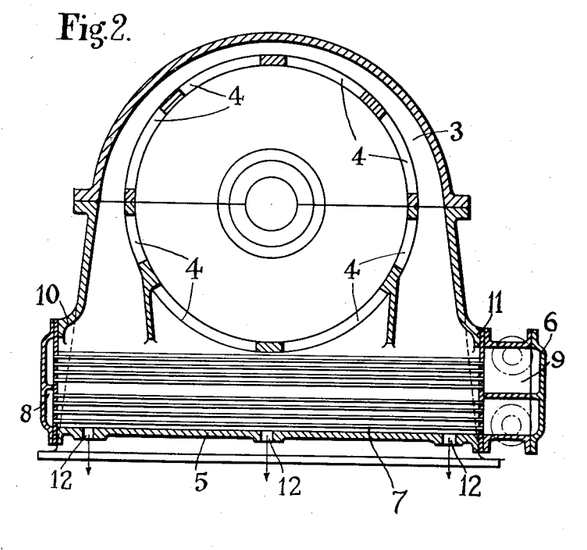
Figure 3:
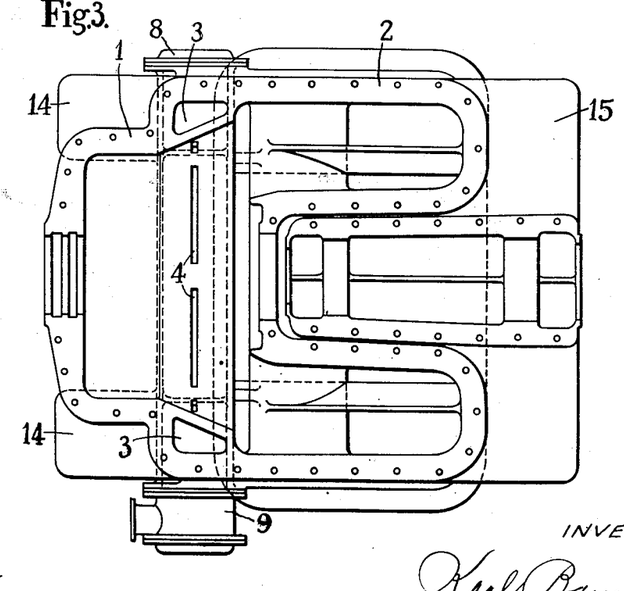
Figure 4:
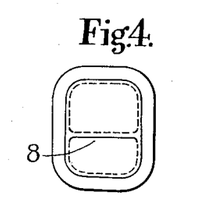
Figs. 4, 5 and 6 are detail views of the heater shown in Figs. 1, 2 and 3 hereinafter explained.
Figure 5:
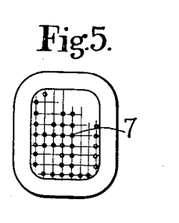
Figure 6:
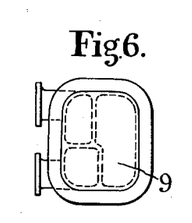

In operation steam from an operative low pressure stage of the turbine will pass through the slots 4, 4 into the steam belt 3 and across the heater tubes 7 heating the feed water circulating therein, the condensed heating steam subsequently flowing away from the heater compartment 5 through the drains 12.

Figure 7:
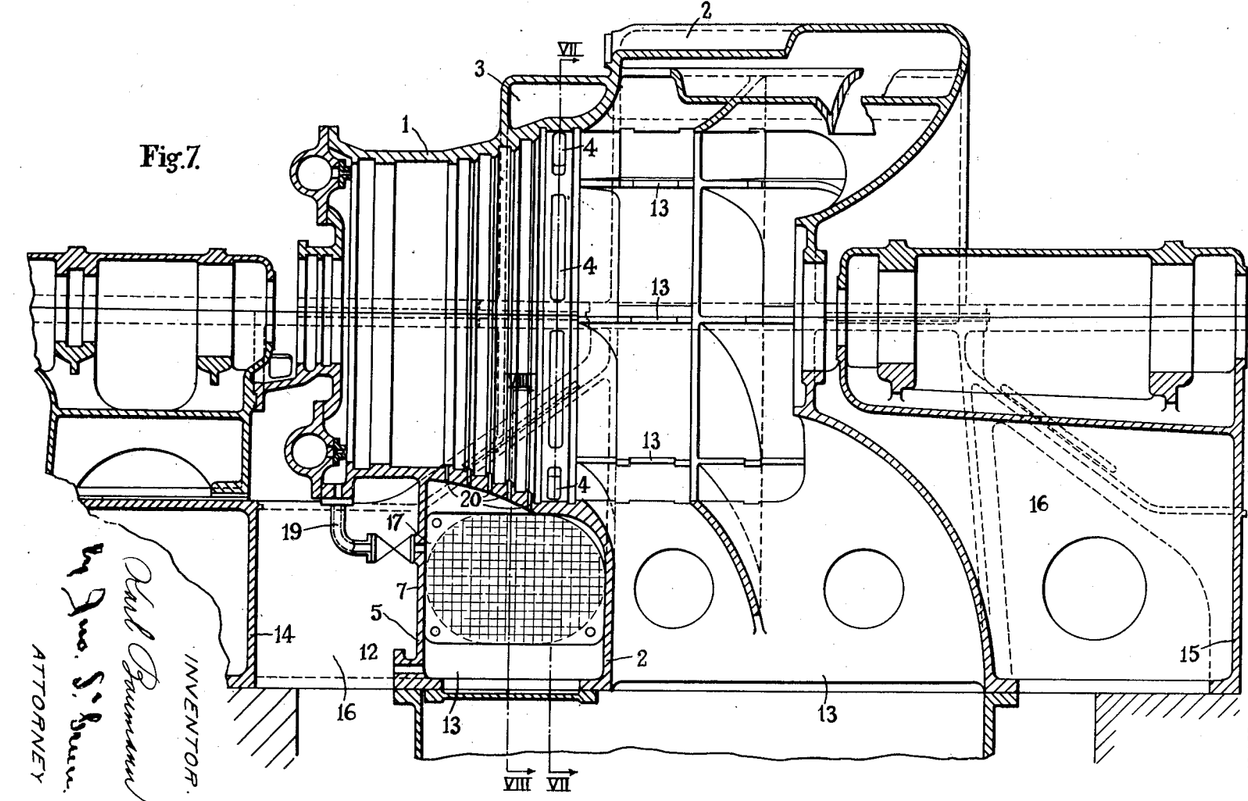
Figure 8:
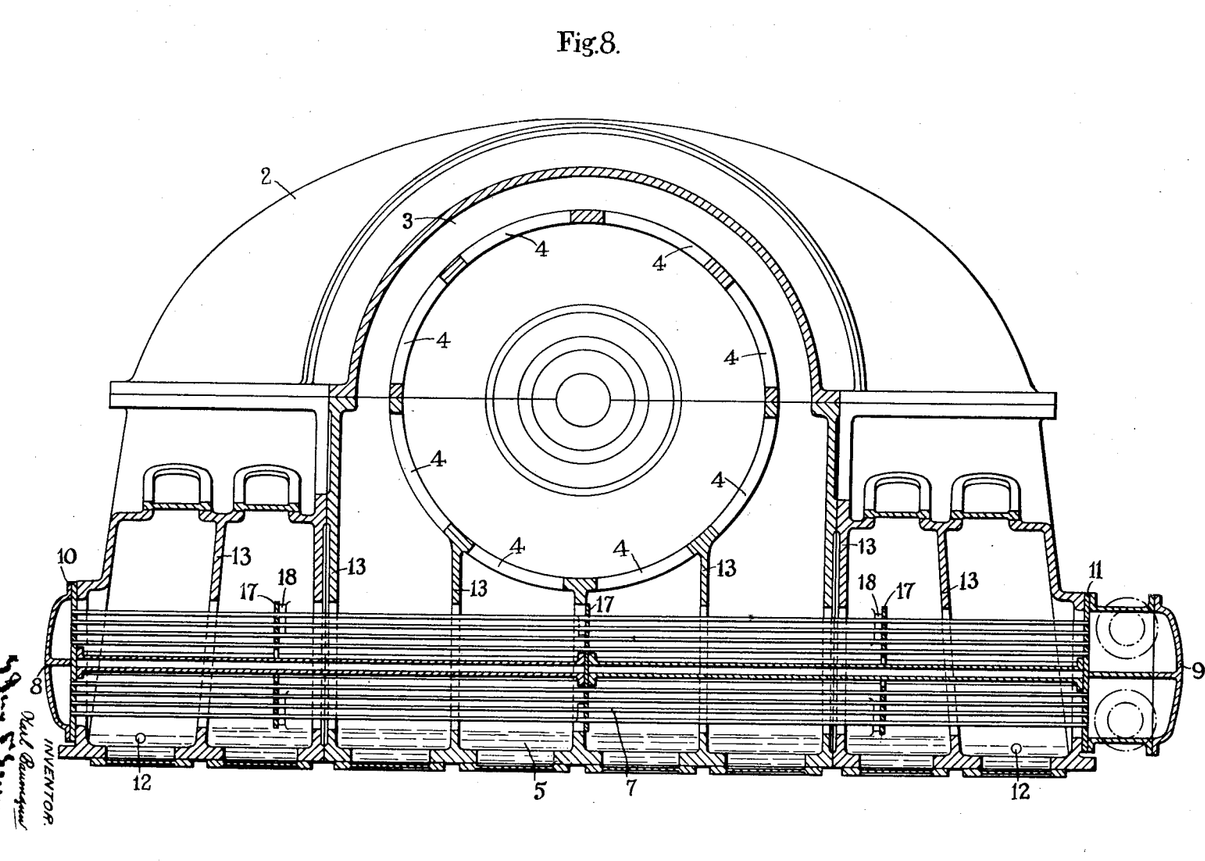

Referring now to Figs. 7 and 8, the exhaust casing and supporting feet of the turbine illustrated in these figures are of the kind described and illustrated in my application Serial No. 123,697, filed October 4, 1916.

The guide walls therein described are here shown at 13 and the feet formed on the ends of the lower half of the exhaust casing are indicated at 14, 15. Said feet are also provided with stiffening webs 16 which are continuations of the lower portions of the guide walls 13.

With this form of turbine exhaust and supporting feet the heater compartment 5 is conveniently formed, as shown, between the exhaust casing and the supporting feet 14, said compartment communicating with the steam chest or belt 3. The lower portions of the guide walls 13 are continued across the heater compartment 5, some of said walls being extended to form the inner vertical walls of the supporting feet 14 and the stiffening webs 16 thereof. This arrangement insures a strong and rigid construction of the lower half of the exhaust casing and at the same time provides a very convenient and compact arrangement of turbine and feed water heater.

Figure 9:
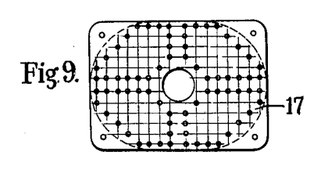
Figs. 9, 10, 11 and 12 are detail views of the heater shown in Figs. 7 and 8 hereinafter explained.
Figure 10:
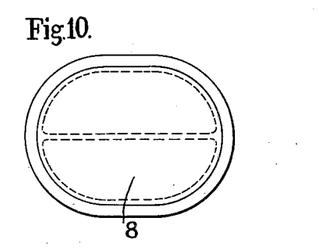
Figure 11:
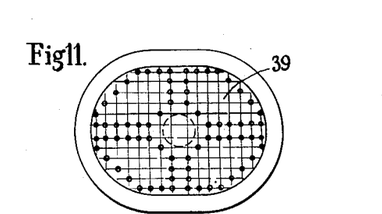
Figure 12:
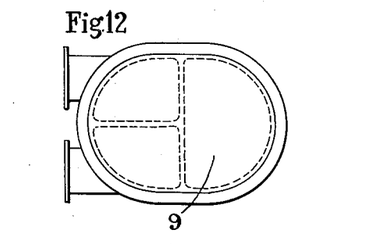

In the construction shown in Figs. 7 and 8 the heater tubes being relatively long, intermediate sagging plates, such as the plates 17, are desirable to maintain the tubes in proper relative position. Such sagging plates may be supported on lugs 18 formed on the end wall of the exhaust casing and the inclosing walls of the heater compartment 5. One of the sagging plates 17 is shown in Fig. 9 and is secured to the lugs 18 by bolts through its corners. The heater 6 is shown as being of the four-flow type, Fig. 10 being an end view of the water box 8, and Fig. 12 a similar view of the inlet and outlet box 9. The tube plate is shown in Fig. 11.

As is well known, various stages of a condensing steam turbine have to be drained, some of them directly into the condenser and quite a considerable amount of heat is lost in the hot condensate and leakage steam which flows through such drains into the condenser. In carrying out the present invention where the heater, or a part thereof, is located below the lowest part of the turbine, the drains from those parts of the turbine operating above the pressure obtaining in the feed water heater are led into the heater compartment, the drainage flowing thereinto by gravity. This arrangement is shown in Fig. 7 the usual drain, indicated at 19, from the lowest point of the inlet end of the turbine cylinder being led, as shown, into the heater compartment 5, other drains 20, 20, also leading from intermediate stages of the turbine cylinder 1 into the heater compartment 5. With this arrangement most of the heat carried away by the drainage will be stored in the heater when the turbine is being started up and transferred to the feed water as soon as the hot well water is available. When the turbine is running the heat in the drainage will be transferred to the feed water circulating through the heater.

Figures 13, 14:
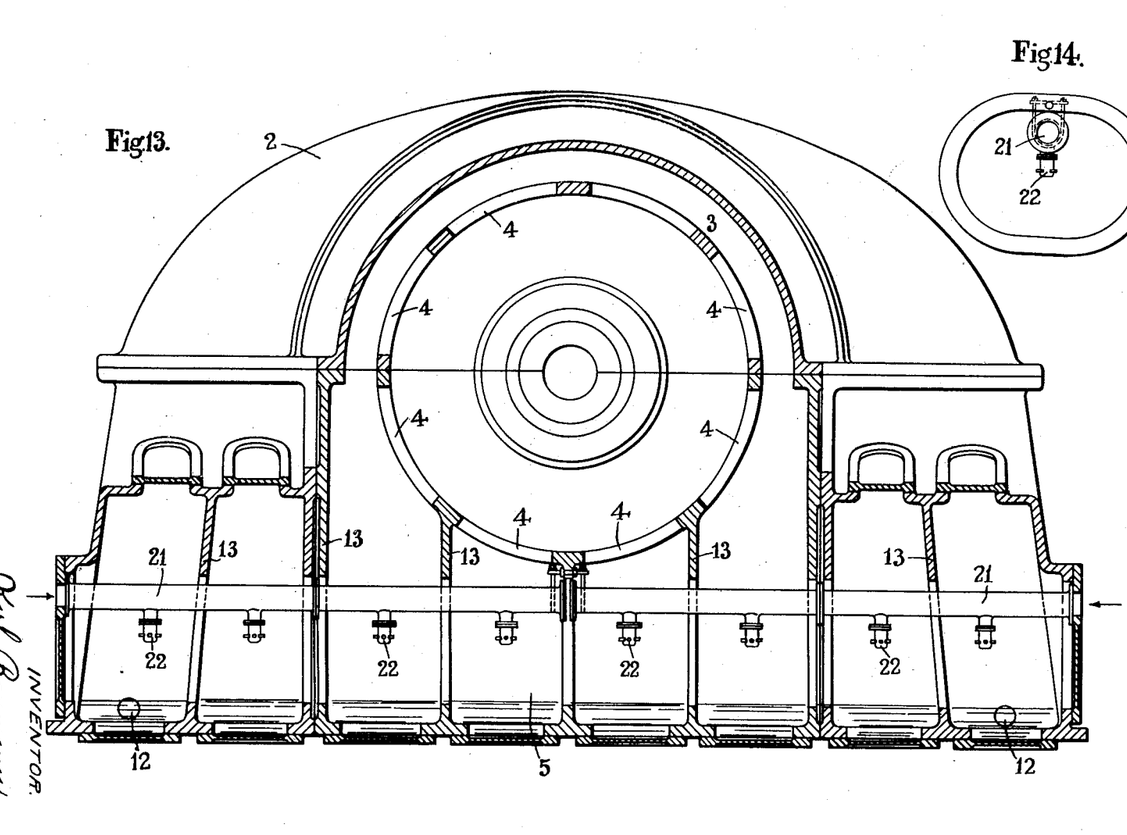

In Fig. 13 the arrangement of the steam belt and heater compartment is similar to that hereinabove described with reference to Figs. 7 and 8. In Fig. 13, however, a heater of the direct contact type is shown, the injection pipe 21 for the feed water leading to the jets 22 being suitably supported in the heater compartment 5, for example, in the manner indicated in Fig. 14.

Figures 15, 16, 19:
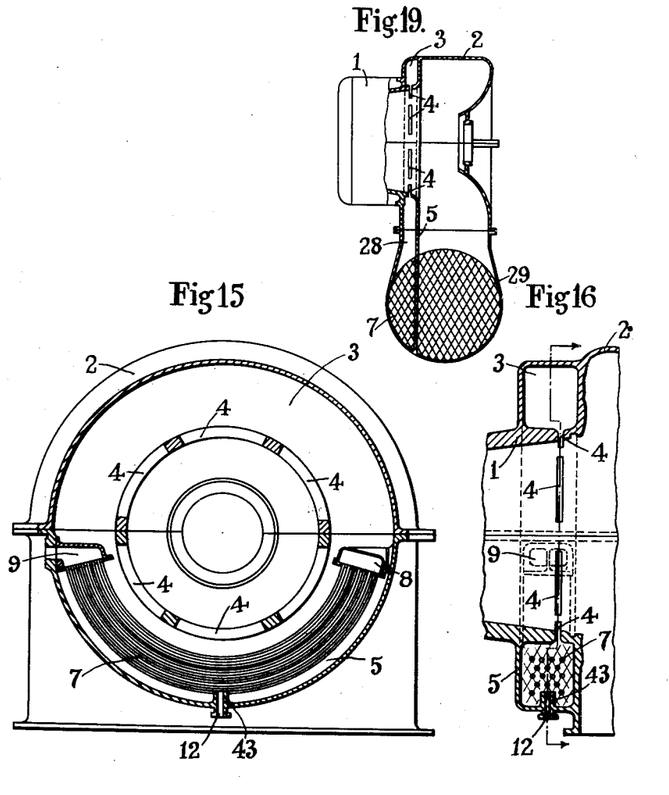

In Figs. 1 to 12 inclusive heaters of the surface type, having straight tubes located horizontally and transversely of the turbine axis, have been shown. In Figs. 15 and 16 is illustrated one arrangement in which curved tubes are used which surround the lower half of the turbine cylinder and conform with the configuration of the steam chest or belt 3 which is suitably enlarged to contain them.

In order to cool the condensed heating steam as far as possible in the heater itself, a weir 43 is sometimes arranged in the bottom of the heater compartment 5 so that portions of the heater tubes are submerged.

A second set of heating tubes may, if desired, be arranged within the upper half of the steam chest or belt, but in this case suitable provision would have to be made to prevent water of condensation falling from the heating tubes through the slots 4 into the working passages of the turbine. This may be done by arranging a shield or trough under the heating tubes in the upper half of the steam chest or belt.

Figures 17, 18, 20, 21:
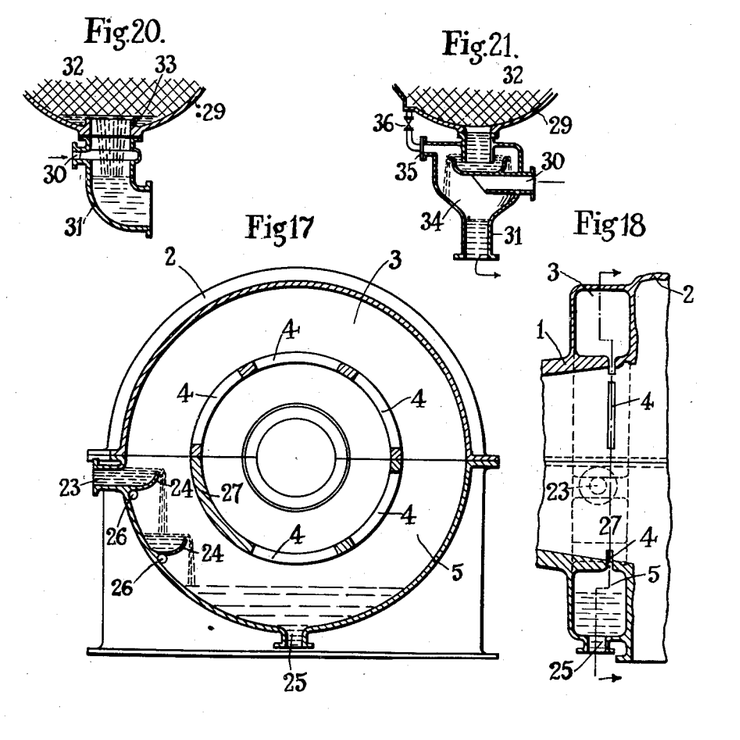
Figs. 17 and 18 are respectively views similar to Figs. 15 and 16 showing a heater of the direct contact type.
Figs. 20 and 21 are sectional views of a main condenser discharge outlet hereinafter explained.

Figs. 17 and 18 show a heater of the direct contact type arranged in the lower half of the heater belt 3. The feed water is led in through the inlet 23 and passes over weirs 24 being withdrawn from the lower portion of the belt 3 through the discharge orifice 25. Any air, vapor or non-condensable gases accumulating in the heater belt are led away through an outlet or outlets 26 to the exhaust or the condenser. In order that water passing over the weirs 24 may not be splashed or sprayed into the working passages of the turbine a shield may be provided for protecting those portions of the slot or slots between the working passages of the turbine and the steam chest or belt through which the water might be passed. Alternatively one or more of the slots 4 are omitted opposite the weirs 24 as shown at 27 in Figs. 17 and 18.

Fig. 19 shows diagrammatically the heater tubes 7 located within a partitioned-off portion 28 of the condenser shell 29. This partitioned-off portion 28 is directly connected with the steam belt 3 from which the supply of heating steam is obtained from the turbine.

Where a heater of the surface type is employed means are provided for leading the condensed heating steam, vapors and non-condensable gases from the heater compartment to the discharge outlet for the condensate usually provided at the bottom of the condenser and not as is usual to a part of the condenser in which the heat would be lost in the circulating water. A convenient arrangement for effecting this is shown in Fig. 20 in which an annular inlet 30 in the discharge pipe 31 of the condenser 32 is connected up with the drains 12. The condensed heating steam flowing through the inlet 30 will thus be mixed with the condensate coming from the condenser 32 while any air and non-condensable vapors will escape into the condenser and be withdrawn therefrom by the air pump. A weir 33 surrounds the condenser discharge outlet and the condensate flowing over said weir will condense any steam and vapor coming from the heater through the drains 12 to the inlet 30.

Another arrangement is shown in Fig. 21 in which a jet heater is arranged in the condensate discharge outlet operating at a higher pressure than that existing in the condenser. By this means steam coming from the heater and entering the inlet 30 will be condensed in a heating chamber 34, air and non-condensable gases escaping through an outlet 35 connected with the vacuum space of the condenser through a relief valve 36 adjusted to maintain the pressure in the heating chamber 34 at the desired degree above that obtaining in the condenser.

Figures 22, 23:
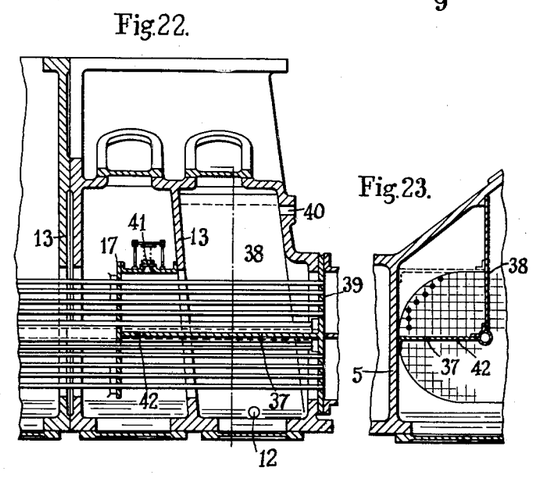
Figs. 22 and 23 are views of a part of the construction shown in Figs. 7 and 8 illustrating a modification in which a portion of the heater compartment is partitioned off for a purpose hereinafter described.

Figs. 22 and 23 show one way in which a portion of the heater may be partitioned-off so that steam at a higher temperature from another source, such for instance as gland or leakage steam from the turbine, may be utilized for heating the feed water after it has been heated by steam from a low pressure operative stage of the turbine.

As shown, division plates 37 and 38 are provided extending from the tube plate 39 to the first sagging plate 17, the portion of the heater tubes inclosed by said division plates, the tube plate 39 and sagging plate 17 being the final portion of the fourth flow, steam being admitted to this divided portion of the heater through the steam inlet 40. A relief valve 41 is provided through which air and non-condensable gases may escape, said valve also acting to maintain the pressure in the divided portion of the heater at the desired value. A small drain 42 in the division plate 37 permits the condensed heating steam to escape into the main heater compartment from whence it flows away through the drain 12.

Although in the accompanying drawings the feed water heater has been shown as being located in the lower half of the turbine casing the invention is not limited in this respect as circumstances may arise which may make it desirable to locate the heater in the upper half of the turbine casing. Constructional forms of the invention other than those hereinabove described and illustrated in the accompanying drawings are also within the spirit and scope of the invention. For example the steam chest or belt 3 has been shown as entirely surrounding the turbine cylinder, but in some cases it may be found sufficient to take the heating steam from a portion only of the periphery of the turbine cylinder, the steam chest or belt being correspondingly restricted in extent.

So also, more than one heater may be located within the steam belt or an extension or heating compartment communicating therewith, and steam may be taken from two or more operative stages of the turbine into appropriate belts and supplied to separate heaters, the water circulating through them in series.

I am aware that it has already been proposed to locate a feed water heater in the exhaust space of a turbine between the final row of moving blades and the condenser, and also that it has been proposed to locate heaters in extensions of the turbine cylinder, the whole of the working steam flowing through the turbine being caused to pass over such heaters and I make no claim to such arrangements.

I claim—

1. In combination with a steam turbine, a feed water heater and a steam belt surrounding the turbine cylinder for conducting steam to said heater.

2. In combination with a steam turbine, a feed water heater located below the turbine cylinder and a steam belt surrounding the turbine cylinder and communicating with said feed water heater.

3. In combination with a steam turbine, a feed water heater of the surface type and a steam belt surrounding the turbine cylinder for conducting steam to said heater.

4. In combination with a steam turbine, a feed water heater of the surface type located below the turbine cylinder, a steam passage extending around the turbine cylinder and communicating with said heater, and steam ports extending from the interior of the cylinder to said passage.

5. In combination with a steam turbine, vertically extending stiffening webs forming supports for the turbine cylinder, feed water heating pipes extending through said webs, a steam channel extending around the turbine cylinder for conducting steam into communication with said pipes, and steam ports for leading steam from the turbine cylinder to said channel.

6. In combination with a multi stage steam turbine, a feed water heater located below one of the turbine stages, a steam chest surrounding the turbine cylinder and communicating with said heater, and ports placing said stage in communication with said steam chest.

In testimony whereof I have hereunto subscribed my name this 17th day of August, 1916.

KARL BAUMANN.

Witnesses:
 JOHN HOY,
 GEORGE SCOTT.